(12) United States Patent
Goellner

(10) Patent No.: US 10,799,994 B2
(45) Date of Patent: Oct. 13, 2020

(54) AUTOMATIC LOAD TABLE

(71) Applicant: Willy Goellner, Rockford, IL (US)

(72) Inventor: Willy Goellner, Rockford, IL (US)

(73) Assignee: Advanced Machine & Engineering Co., Rockford, IL (US)

( * ) Notice: Subject to any disclaimer, the term of this patent is extended or adjusted under 35 U.S.C. 154(b) by 0 days.

(21) Appl. No.: 16/123,787

(22) Filed: Sep. 6, 2018

(65) Prior Publication Data

US 2020/0078891 A1    Mar. 12, 2020

(51) Int. Cl.
*B23Q 7/00* (2006.01)
*B23Q 7/05* (2006.01)

(52) U.S. Cl.
CPC ............ *B23Q 7/001* (2013.01); *B23Q 7/005* (2013.01); *B23Q 7/055* (2013.01); *B23Q 2240/007* (2013.01); *B23Q 2707/05* (2013.01)

(58) Field of Classification Search
CPC ........ B23Q 7/001; B23Q 7/005; B23Q 7/055; B23Q 2240/007; B23Q 2707/05; B65G 21/12; B65G 21/14; B65G 21/00
USPC ......... 414/745.9, 746.1, 746.2, 746.3, 746.4, 414/910, 911; 198/594, 812
See application file for complete search history.

(56) References Cited

U.S. PATENT DOCUMENTS

| | | | | |
|---|---|---|---|---|
| 2,993,606 A * | 7/1961 | Helstrom | ........... | B65G 47/1492 414/745.9 |
| 2,995,235 A * | 8/1961 | Maier, Jr. | .............. | B21B 39/002 198/774.2 |
| 3,042,226 A | 7/1962 | Maciejczak | | |
| 3,130,830 A | 4/1964 | Allbeson | | |
| 3,157,071 A * | 11/1964 | Pachell | ................. | B21B 39/004 414/754 |
| 3,768,626 A | 10/1973 | Vossler et al. | | |
| 5,174,351 A * | 12/1992 | Lindenblatt | ............. | B27B 5/228 144/242.1 |
| 5,257,688 A * | 11/1993 | Fridlund | ................ | B65G 25/04 198/443 |
| 5,351,729 A * | 10/1994 | Brisson | .................. | B65G 25/08 144/242.1 |
| 5,423,417 A * | 6/1995 | Redekop | ................. | B27B 31/00 198/774.1 |
| 6,336,547 B1 * | 1/2002 | Redekop | ................ | B65G 25/08 198/444 |
| 6,637,581 B2 * | 10/2003 | Goater | ............... | B65G 47/1471 198/459.5 |
| 9,604,274 B2 | 3/2017 | Gariglio et al. | | |
| 2005/0022903 A1 | 2/2005 | Woodham | | |
| 2013/0048468 A1 | 2/2013 | Krauss et al. | | |

FOREIGN PATENT DOCUMENTS

| | | |
|---|---|---|
| EP | 1 088 776 | 4/2001 |
| GB | 598619 | 2/1948 |

* cited by examiner

*Primary Examiner* — Lynn E Schwenning
(74) *Attorney, Agent, or Firm* — Reinhart Boerner Van Deuren P.C.

(57) ABSTRACT

An automatic load table and related method are provided. The automatic load table utilizes a movable loading arm and a riser assembly with a stepped configuration. The movable loading arm is operable to move billets in a loading direction along the stepped configuration of the riser assembly. The movable loading arm is capable of lifting and separating adjacent billets in a single lifting motion.

18 Claims, 20 Drawing Sheets

AUTOMATIC LOAD TABLE

FIELD OF THE INVENTION

This invention generally relates to manufacturing machinery, and more particularly to automated billet saws, and even more particularly to devices used to feed billets into the automated billet saw.

BACKGROUND OF THE INVENTION

Automated billet saws are readily recognized as a viable means for sawing relatively large billets of metal or other materials into smaller sized pieces. Such billets may for example be cylindrical in shape, and vary in both diameter and length. The billets are fed into a sawing area of the automatic billet saw via a feed arrangement. This feed arrangement can include a load table with a conveyor, the latter of which progresses the billet into the sawing area along a direction is which is generally transverse to the sawing direction of the machine.

Positioning the billets onto the conveyor is typically done via another portion of the load table. Such load tables are operable to progress the billets from an initial holding area onto their associated conveyor. These load tables have proven to be an efficient means for achieving their function, as they can be synchronized with the sawing operation to achieve a continuous loading, feeding, and sawing arrangement for continuous repeatable saw cutting of the billets.

Unfortunately, such tables are not without their drawbacks. First, they are highly complex, with many existing designs requiring multiple independently actuated mechanisms for separating a billet from adjacent billets, and for moving the billet onto the aforementioned conveyor. Due to this complexity, cost and maintenance can be problematic for certain applications.

Further, such load tables typically operate with billets of the same general shape and size. In other words, moving from a first set of billets at a given diameter to a second set of billets at a different diameter than the first set can require stopping operations to configure the load table accordingly. Because such stopping can result in lost manufacturing time, and thus lost revenues, such set up time can be problematic.

Accordingly, there is a need in the art for a load table which address the above drawbacks. The invention provides such an automatic load table. These and other advantages of the invention, as well as additional inventive features, will be apparent from the description of the invention provided herein.

BRIEF SUMMARY OF THE INVENTION

In one aspect, the invention provides an automatic load table for loading billets into a machine. An embodiment of such an automatic load table includes a conveyor for advancing the billets in a feed direction and at least one riser assembly positioned adjacent the conveyor for moving the billets in a loading direction which is transverse to the feed direction onto the conveyor. The at least one riser assembly includes a riser body and a loading arm movable relative to the riser body. The riser body includes a plurality of billet support portions for supporting the billets from an underside of the billet and a plurality of ramped portions arranged such that one ramped portion is positioned between adjacent billet support portions. The billet support portions being at different elevations relative to one another. An extension height of each ramped portion successively decreases when progressing in the loading direction towards the conveyor.

In an embodiment according to this aspect, the riser body includes an interior space, wherein the loading arm is movable within the interior space.

In an embodiment according to this aspect, the at least one riser assembly further comprises an actuation means for moving the loading arm relative to the riser body. The actuation means may for non-limiting example be a linear actuator.

In an embodiment according to this aspect, each one of the plurality of billet support portions defines upper-facing coplanar support surfaces. The support surfaces of each billet support portion define a support plane for their respective billet support portion. The support planes of the plurality of billet support portions being parallel to one another.

In an embodiment according to this aspect, the loading arm is attached at a pivot point of the riser body and is adjacent an exterior of the riser body. The loading arm includes a plurality of steps. The plurality of steps are arranged to simultaneously advance each of the billets from a respective current billet support portion to a respective next billet support portion.

In another aspect, the invention provides an automatic load table comprising. An embodiment of such an automatic load table includes a conveyor for advancing the billets in a feed direction and at least one riser assembly positioned adjacent the conveyor for moving the billets in a loading direction which is transverse to the feed direction onto the conveyor. The at least one riser assembly includes a riser body defining a first plurality of steps and a loading arm movable relative to the riser body. The loading arm defines a second plurality of steps. The loading arm is movable relative to the riser body such that the loading arm advances the billets in the feed direction up the first plurality of steps.

In an embodiment according to this aspect, the riser body includes a plurality of billet support portions for supporting the billets from an underside of the billet and a plurality of ramped portions arranged such that one ramped portion is positioned between adjacent billet support portions.

In an embodiment according to this aspect, the billet support portions are at different elevations relative to one another. An extension height of each ramped portion successively decreases when progressing in the loading direction towards the conveyor.

In an embodiment according to this aspect, the at least one riser assembly further comprises an actuation means for moving the loading arm relative to the riser body.

In an embodiment according to this aspect, the automatic load table also includes at least one billet sensor, the at least one billet sensor arranged to detect the presence of a billet on a respective one of the billet support portions.

In an embodiment according to this aspect the automatic load table also includes a first loading arm sensor and a second loading arm sensor. The first loading arm sensor is configured to detect the loading arm at a lowered position of the loading arm. The second loading arm sensor is configured to detect the loading arm at a raised position of the loading arm.

In yet another aspect, the invention provides a method for feeding billets into a machine. An embodiment of such a method includes moving the billets along a loading direction through a plurality of loading segments. The method also includes separating a single billet from a remainder of the billets at at least one of the loading segments by lifting the single billet away from the remainder of the billets positioned at the loading segment.

In an embodiment according to this aspect, each loading segment includes a billet support portion and a ramped portion. The step of moving the billets through the plurality of loading segments includes moving the billets from a current billet support portion to a next billet support portion at a different elevation than the current billet support portion.

In an embodiment according to this aspect, the step of moving the billets through the plurality of loading segments includes contacting the ramped portion between the current billet support portion and the next billet support portion with one of the billets.

In an embodiment according to this aspect, the step of moving is performed using a loading arm, the loading arm movable relative to a riser body, the riser body defining the plurality of loading segments.

In an embodiment according to this aspect, the step of separating the single billet is done by lifting the single billet using a portion of the movable loading arm such that the remainder of the billets remain at the loading segment.

In an embodiment according to this aspect, the method also includes situating the single billet on a conveyor and feeding the single billet along a feeding direction into the machine, the feeding direction transverse to the loading direction.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an embodiment of an automatic loading table for loading billets into a machine. While the loading table will be described herein in the context of a billet saw, the automatic loading table according to the instant invention is not limited to the context of a billet saw. Indeed, it may be readily utilized in any operation where it is desirable to feed billets along a feed axis for subsequent operations. As will be understood in greater detail from the following, the automatic load table advantageously utilizes a single motion to simultaneously lift and separate billets as they are progressed along a loading direction. This configuration presents a distinct advantage over contemporary approaches which typically lift and separate in separate operations, and in many cases with separate mechanisms.

Figure 1:
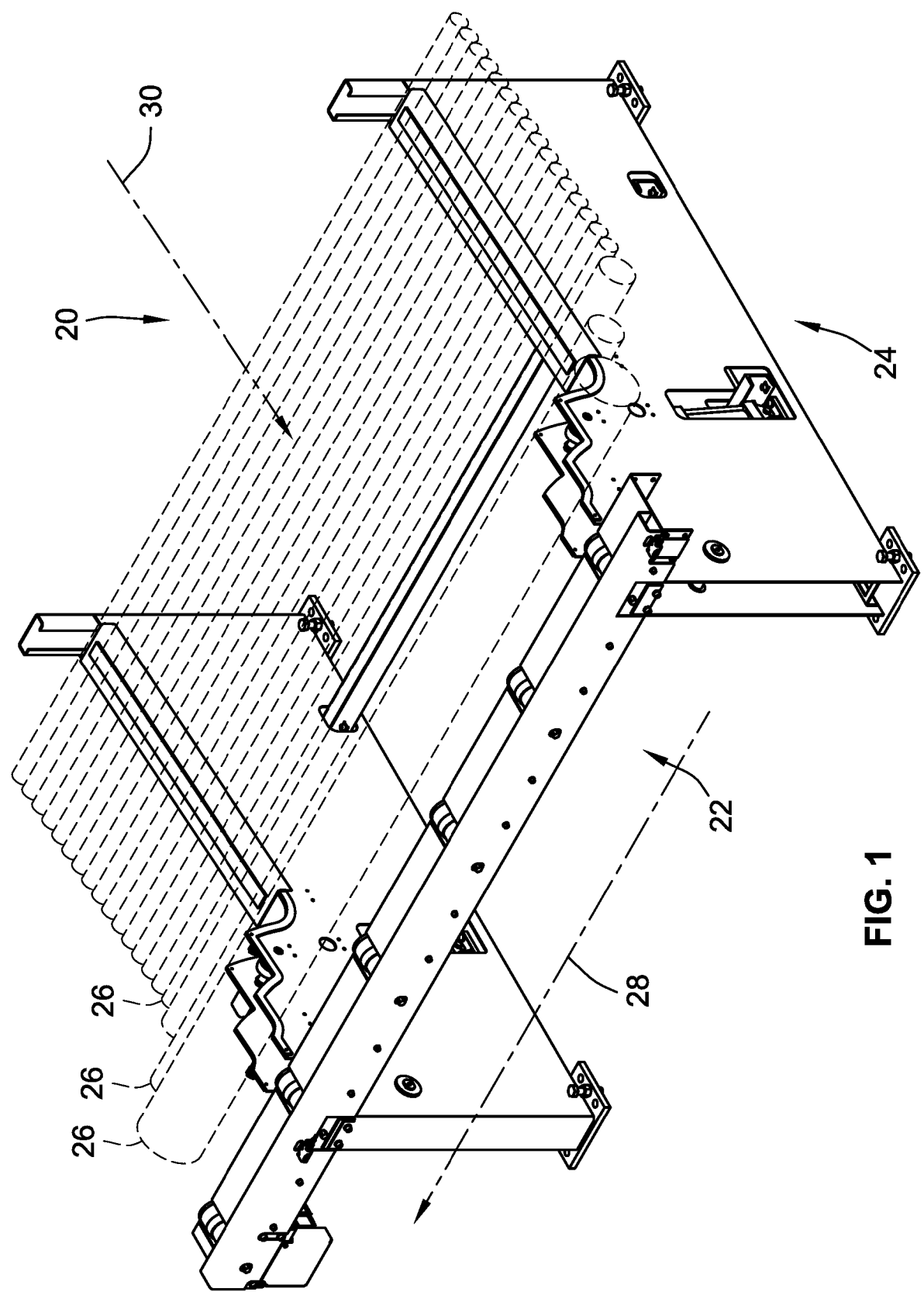
FIG. 1 is a perspective view of an exemplary embodiment of an automatic load table according to the teachings herein, having a plurality of different sized billets situated thereon.

With particular reference to FIG. 1, the same illustrates an embodiment of an automatic loading table 20. Loading table 20 includes a conveyor 22 and at least one riser assembly 24 for advancing one or more billets 26 of differing size along riser assembly 24 and onto conveyor 22. Although two riser assemblies are illustrated, it is contemplated that a single riser assembly could also be utilized. As one example, a shorter conveyor 22 and/or billet 26 length may only necessitate a single riser assembly 24. Conversely, a longer conveyor 22 and/or billet 26 length may necessitate more than two riser assemblies 24. As such, the description of one riser assembly 24 provided herein applies equally well to the other riser assembly 24 shown, as well as any additional riser assemblies 24 that might be included. According to the teachings herein, any number of riser assemblies 24 may be employed.

Conveyor 22 is operable to advance a billet 26 situated thereon along a feed direction 28 into a machine, such as a billet saw for subsequent operations. Riser assemblies 24 are operable to advance billets 26 along a loading direction 30, which is transverse to the feed direction 28. As illustrated, a plurality of billets 26 are shown situated on loading table 20. Loading table 20 successively advances billets 26 along feed direction 30 such that they are positioned, one by one, onto conveyor 22. In FIG. 1, billets of identical diameter are shown. However, as will be made clear from the following description, billets of differing diameters and lengths may be situated on loading table 20 together. Via its advancing operations, loading table 20 is operable to move these differently sized billets along loading direction 20 while simultaneously separating them such that only a single billet 26 is ultimately placed upon conveyor 22. As will be explained in greater detail below, this functionality is achieved by employing a riser assembly 24 having a stepped configuration.

Figure 2:
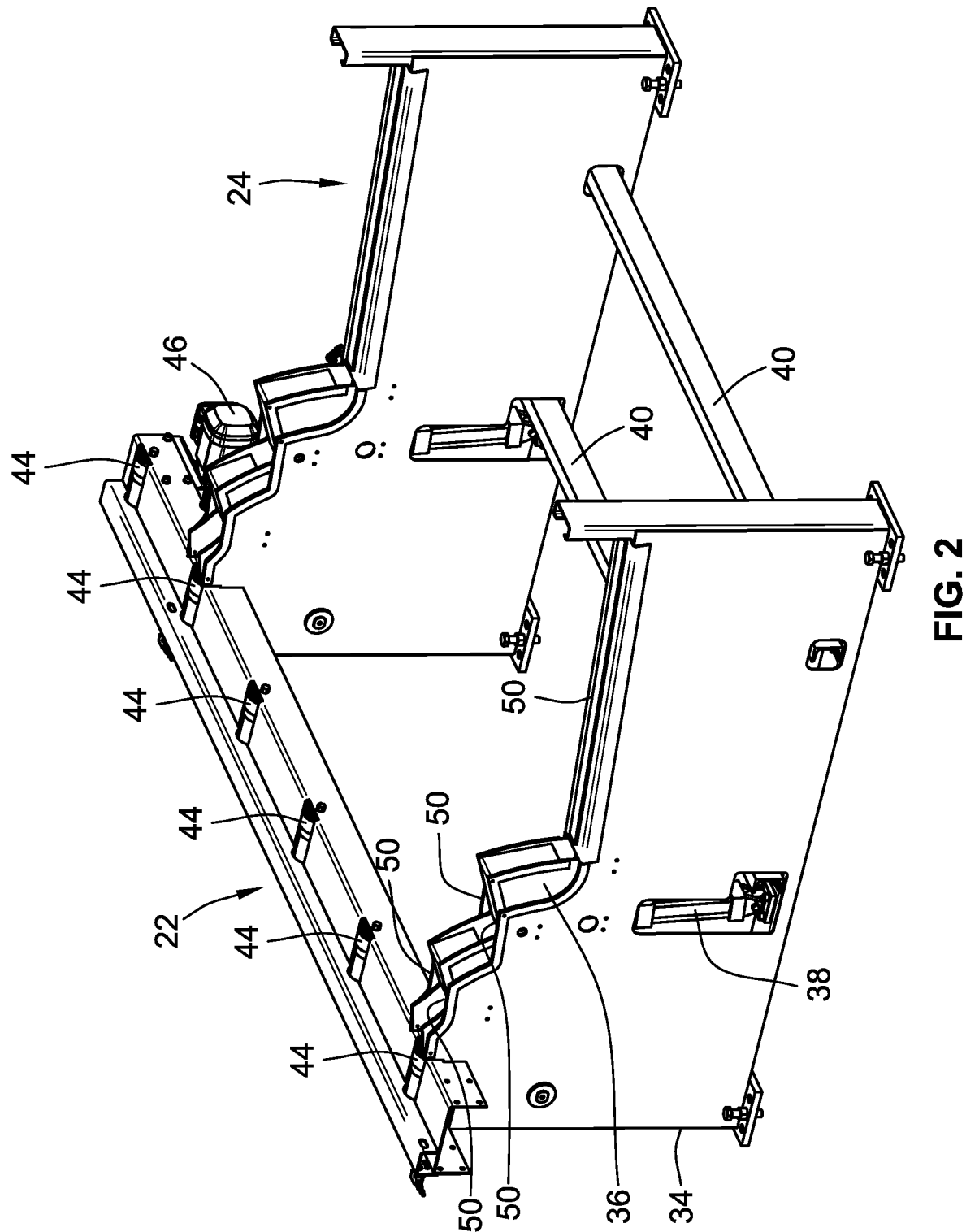
FIG. 2 is another perspective view of the automatic load table of FIG. 1.

Turning now to FIG. 2, riser assembly 24 includes a riser body 34 which defines an interior space 42 (see FIG. 3) defined between opposed side plates of riser body 34. A movable loading arm 36 is situated within this interior space (or adjacent the riser body as described below relative to FIG. 20) and is movable relative to riser body 34 such that a portion of movable loading arm is repeatedly exposed from the interior space of riser body 34. More specifically, movable loading arm repeatedly moves from a lowered position as is shown in FIG. 4, to a raised position as is shown in FIG. 2, and then from the raised position back to the lowered position.

As may be surmised from FIG. 2, both riser body 34 and movable loading arm 36 present a plurality of steps. As will be explained below, movement of movable loading arm from the lowered position to a raised position will move a billet from its current billet support portion, i.e. the portion of riser body currently supporting the billet, to an adjacent billet support portion, i.e. the portion of the next adjacent step when moving in loading direction 30 (see FIG. 1) which supports the billet. These billet support portions are defined by upper facing surfaces 50 of riser body 34 defining in part the stepped shape thereof.

In other words, when movable loading arm 36 moves from the lowered position to the raised position, the stepped shape of movable loading arm 36 is operable to move at least one billet up one step of riser body 34. Further, when movable loading arm 36 returns to the lowered position, the billet moved is then positioned above the next step of the movable loading arm 36. In the lowered position, movable loading arm 36 may be positioned such that it remains in contact with the billet such that both movable loading arm 36 and upper facing surfaces 50 contact the billet, or may be such that movable loading arm 36 is retracted entirely into the interior space of riser body 34 so that only upper facing surfaces 50 contact the billet. The specifics of this operation are discussed in the context of FIGS. 5-17 discussed below.

The movement of movable loading arm 36 may be achieved by any actuation means. In the illustrated embodiment, this actuations means is in the form of a linear actuator 38. Linear actuator 38 may be hydraulic, pneumatic, or electric. Alternatively, the actuation means may take the form of any device which can move movable loading arm 36 as described herein.

As may also be seen in FIG. 2, conveyor 22 includes a plurality of rollers 44 which are used to advance a billet situated on conveyor in the above described feed direction 28. Rollers 44 may be synchronously driven by a motor 46 as shown. It is also conceived that a conveyor belt could also be employed.

Figure 3:
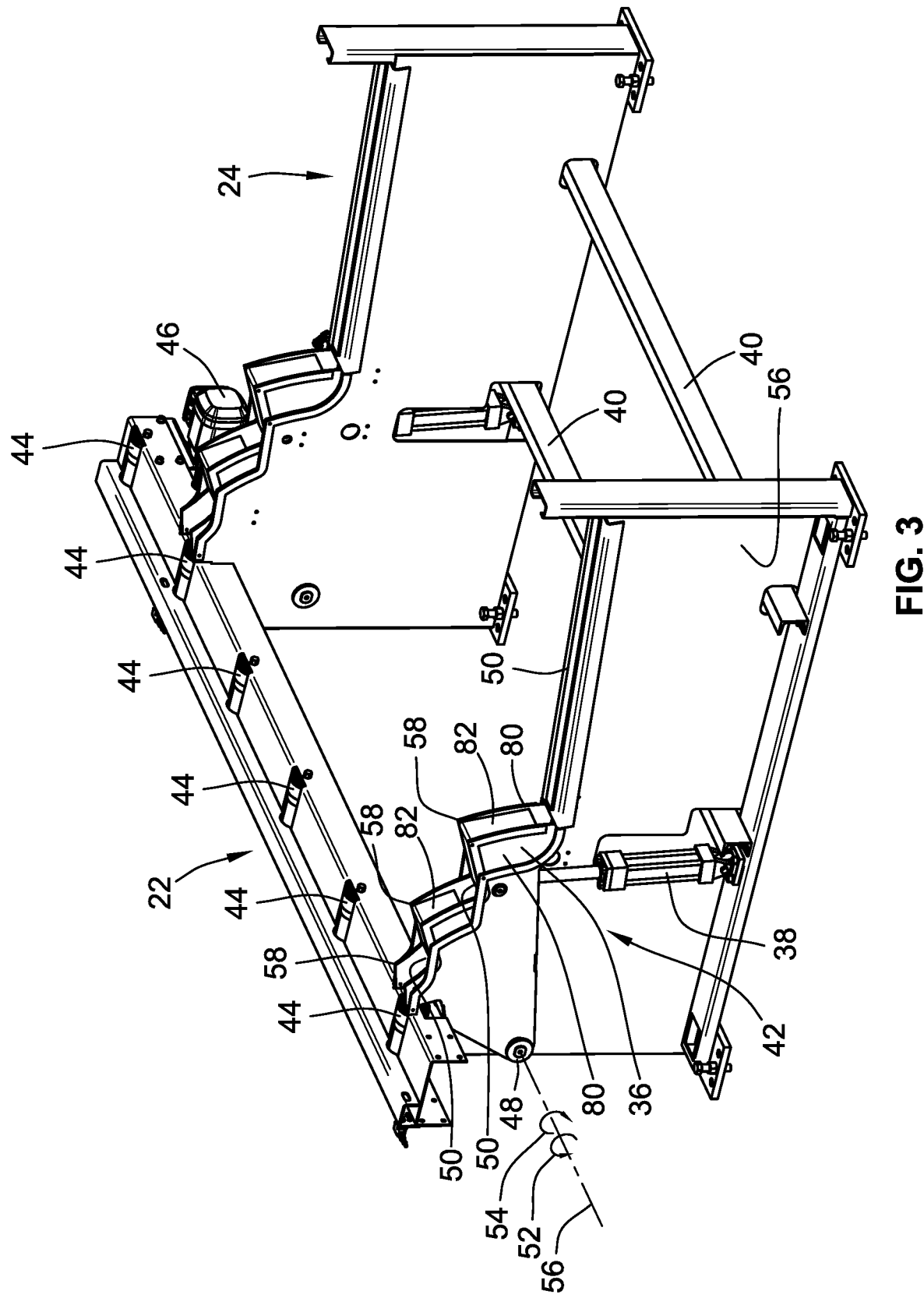
FIG. 3 is a perspective view of the automatic load table of FIG. 1, with an actuation means and a movable loading arm exposed.
Figure 4:
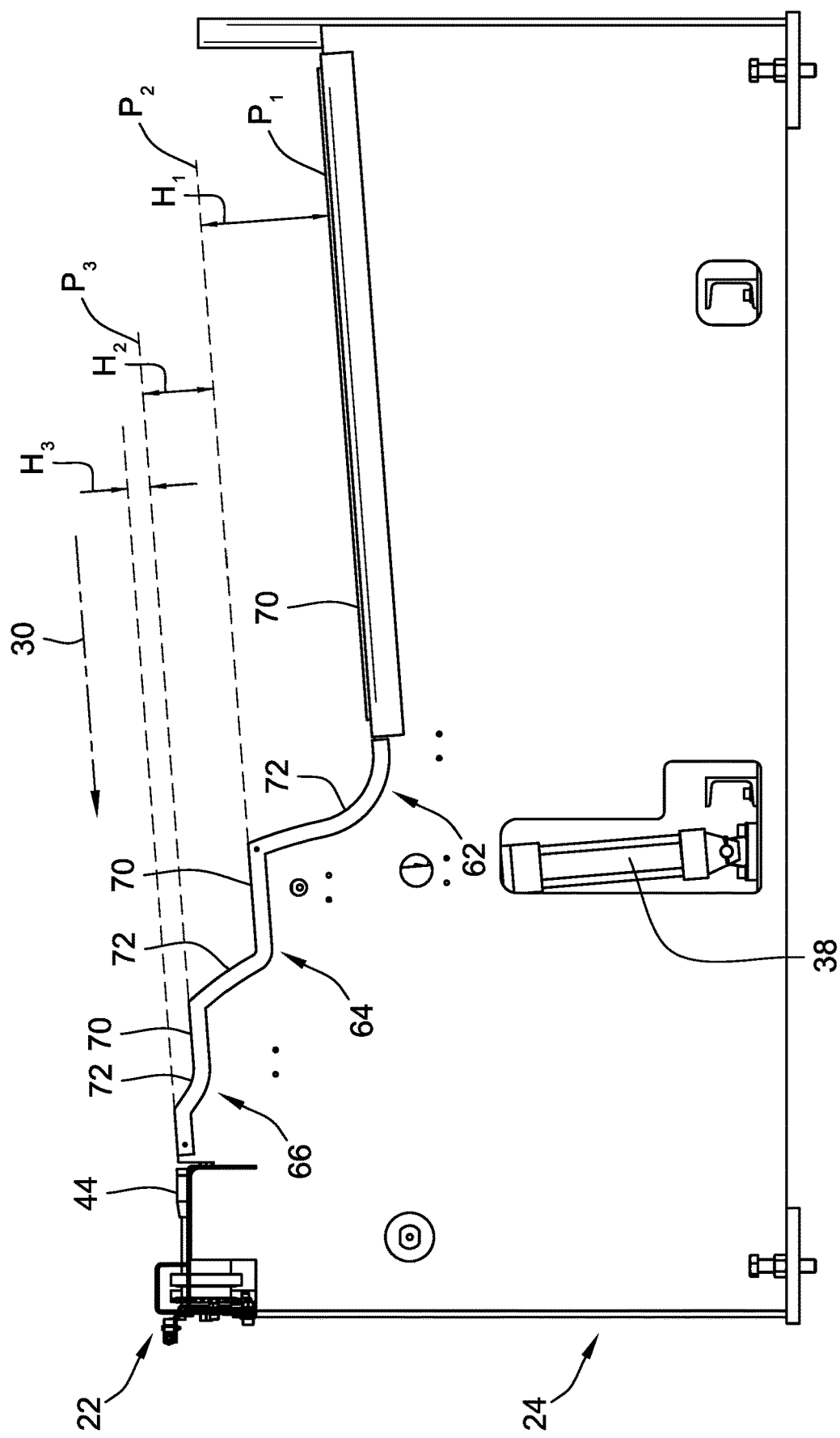
FIG. 4 is a side view of the automatic load table of FIG. 1.

Turning now to FIG. 3, the same illustrates riser assembly 24 with one of its side plates 56 removed to show the entirety of movable loading arm 36 within interior space 42, or adjacent to a riser body as described below relative to FIG. 20. As introduced above, movable loading arm includes a plurality of steps 58. These steps 58 have differing geometry from one another as one moves in loading direction 28 (see FIG. 1) along movable loading arm 36. Generally, steps 58 decrease in height and length when moving in loading direction 28 towards conveyor 22. The same holds true for the steps defined by riser assembly 24 in that they decrease in height and length when moving in loading direction 28 towards conveyor 22.

Movable loading arm 36 is attached at a pivot 48 to riser body 34. Movable loading arm 36 is pivotable in directions 52, 54 about a pivot axis 56 defined by pivot 48. As a result of this single pivot, and as a result of the linkages of linear actuator 38 to movable loading arm 36 and riser body 34, movable loading arm 36 generally moves in an arcuate path when moving between the raised and lowered positions. Lengthening of linear actuator 38 pivots movable loading arm 36 in direction 52. Shortening of linear actuator 38 pivots movable loading arm 36 in direction 54.

Similar to the side plates 56 used for the construction of riser body 34, movable loading arm 36 is formed by a pair of side plates 80 arranged in an opposed spaced relationship to one another. Step spacers 82 are positioned between side plates 80 for structural support. Side plates 80 and step spacers 82 are arranged such that they define the steps 58 of movable loading arm 36.

FIG. 4 illustrates a side view of loading table 20. As is more easily seen in this view, the steps of riser body 34 define distinct loading segments 62, 64, 66 of loading table 20. Each loading segment 62, 64, 66 has its own billet support portion 70, and a ramped portion 72 extending upwardly from its associated billet support portion 70. Billet support portions 70 are defined by the previously introduced upper facing surfaces 50 of each loading segment 62, 64, 66 (see FIG. 2).

As briefly mentioned above, each loading segment 62, 64, 66 has a respective extension height $H_1$, $H_2$, $H_3$, defined between its billet support portion 70 and the adjacent billet support portion of the next loading segment when moving in loading direction 30 towards conveyor 22, except in the case of height $H_3$, which is the distance between billet support portion 70 of loading segment 66 and the final roll-away surface beginning at the end of ramped portion 72 of loading segment 66. These extension heights $H_1$, $H_2$, $H_3$, successively decrease when moving in loading direction 30 towards conveyor 22 as shown. As may also be seen in this view, the upper facing surfaces 50 (see FIG. 2) defining each billet support portion 70 define planes $P_1$, $P_2$, $P_3$, which are parallel to one another.

As will be apparent from the disclosure which follows relative to FIGS. 5-17, due to the generally canted orientation of each ramped portion 72 relative to its associated billet support portion 70 and the arcuate movement of movable loading arm 36, a billet will be lifted off of billet support portion 70 by movable loading arm 36 such that a step 58 of movable loading arm supports the lifted billet. Simultaneously the billet will glide along ramped portion 72, until movable loading arm 36 reaches the raised position. In the raised position, the billet will roll along movable loading arm 36 and be transferred to the next billet support portion 70. With each successive raising and lowering cycle, one more billets are advanced from their current billet support portion 70 to the next billet support portion 70.

Figure 5:
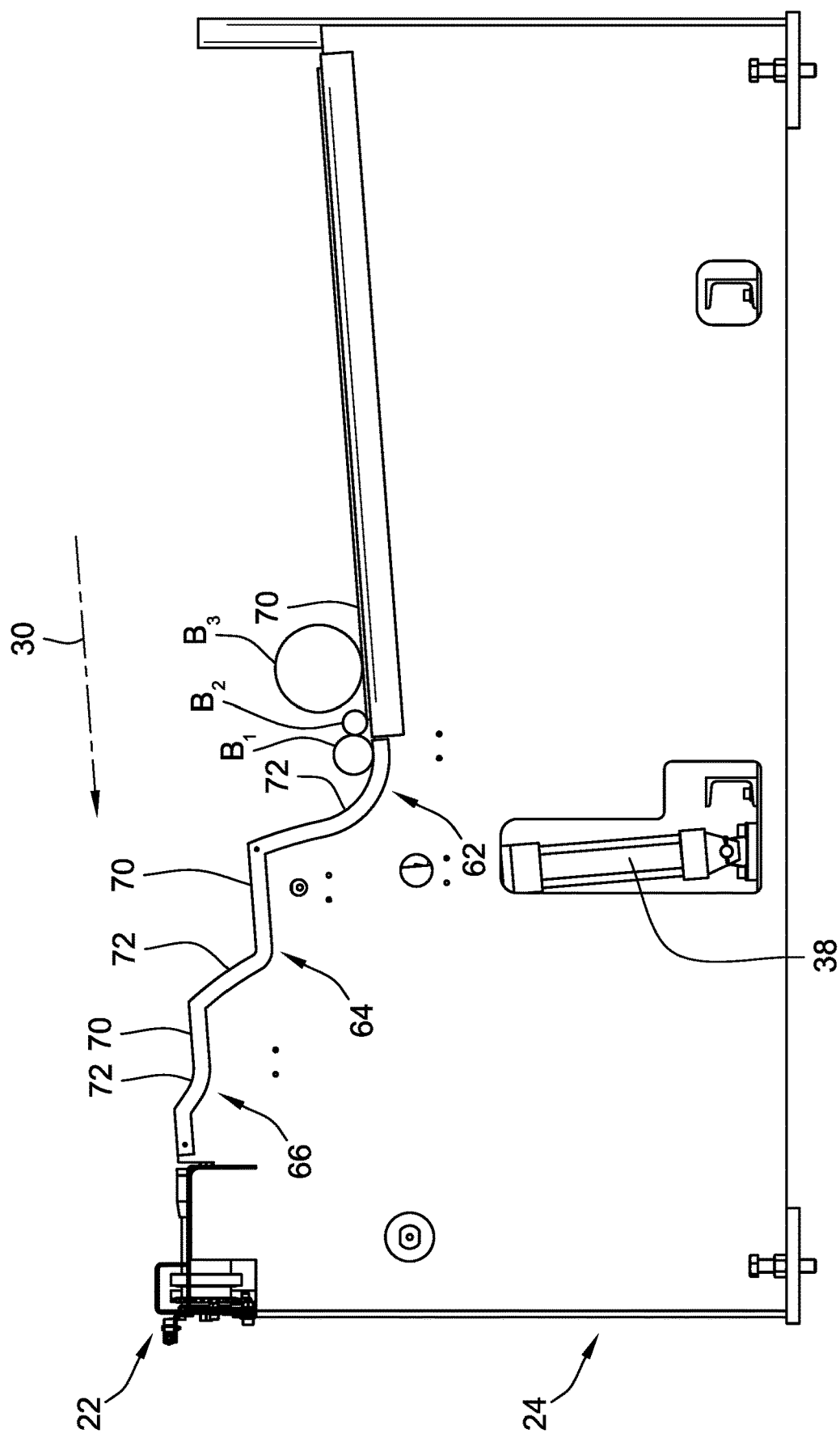
FIGS. 5-17 are side views of the automatic load table of FIG. 1, with the movable loading arm successively transitioning from a lowered position to a raised position.

FIGS. 5-17 describe successive movements of movable loading arm 36 from its lowered position to its raised position. While a single riser assembly 24 is shown and described, it will be appreciated that the following description of the movement of movable loading arm 36 applies to all riser assemblies 24 of loading table 20. This motion occurs simultaneously so that the billets are evenly lifted. With particular reference to FIG. 5, the same illustrates a side view of loading table 20 with movable loading arm 36 in the lowered position. Three differently sized billets $B_1$, $B_2$, $B_3$ are situated on the first loading segment 62. The terms first, second, and third used in the context of loading segments 62, 64, 66, denotes the order in which billets $B_1$, $B_2$, $B_3$ will encounter the segments when moving in loading direction 30.

Figure 6:
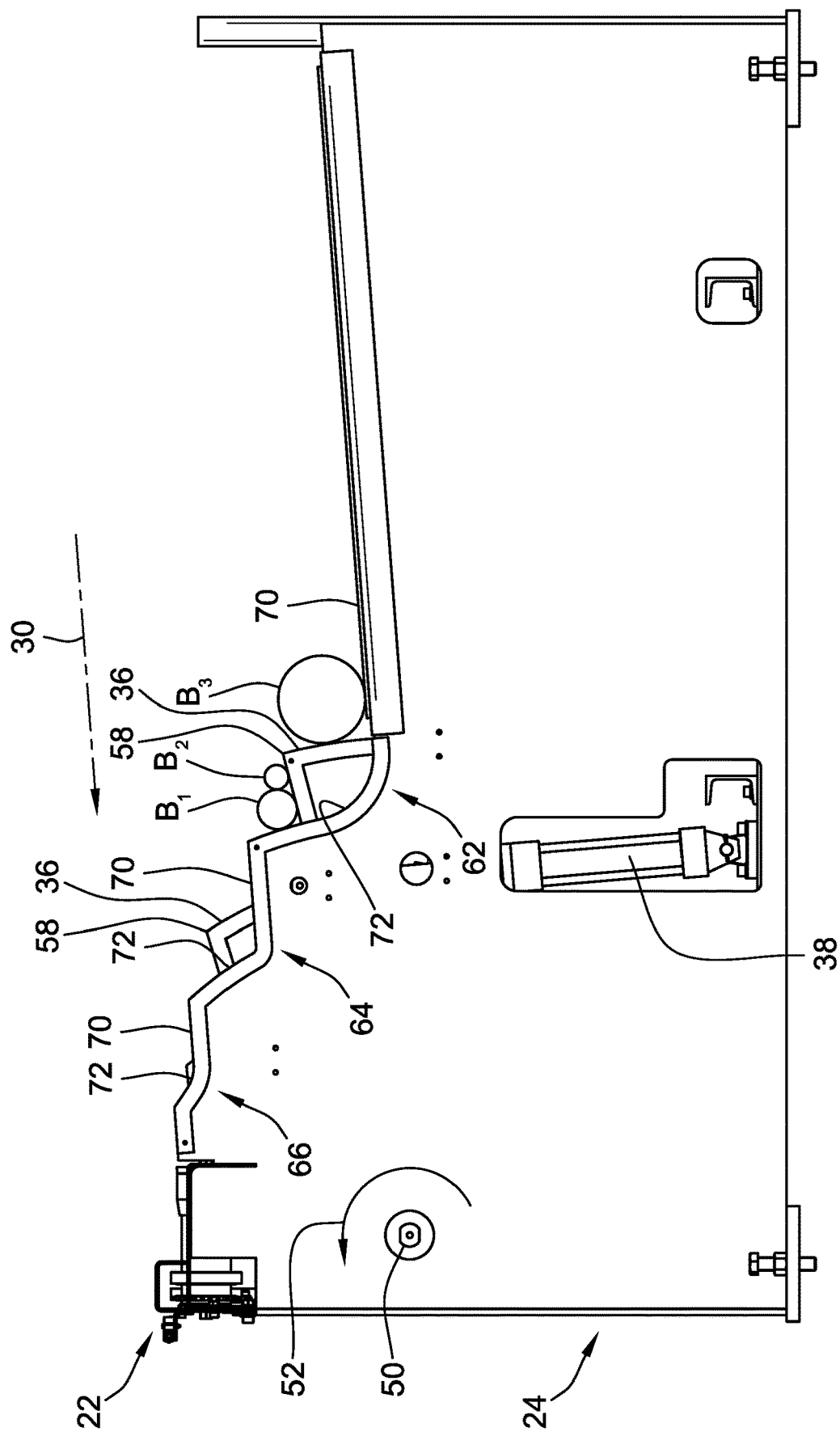

Turning now to FIG. 6, movable loading arm 36 has partially moved from the lowered position to the raised position. Because of the amount of protrusion of step 58 beyond ramped portion 72 of loading segment 62 and the diameters of billets $B_1$, $B_2$, only billets $B_1$ and $B_2$ are lifted off of billet support portion 70 of loading segment 62. Billet $B_1$ rests against ramped portion 72, while billet $B_2$ rests against $B_1$.

As may also be surmised from inspection of FIG. 6, the amount of protrusion of each step 58 beyond the respective adjacent ramped portion 72 decreases when moving in loading direction 30. As a result, the number of billets lifted by movable loading arm 30 reduces when moving in loading direction 30, so that ultimately only one billet will be transferred to conveyor 22. Depending upon the sizing of billets loaded onto load table 20, and due to the aforementioned reducing protrusion amount of each step 58, at at least one of the loading segments 62, 64, 66, a single billet will be lifted from the adjacent billets (the billets in that segment not being lifted) in that segment. As a result, this single billet will be simultaneously separated and lifted.

Figure 7:
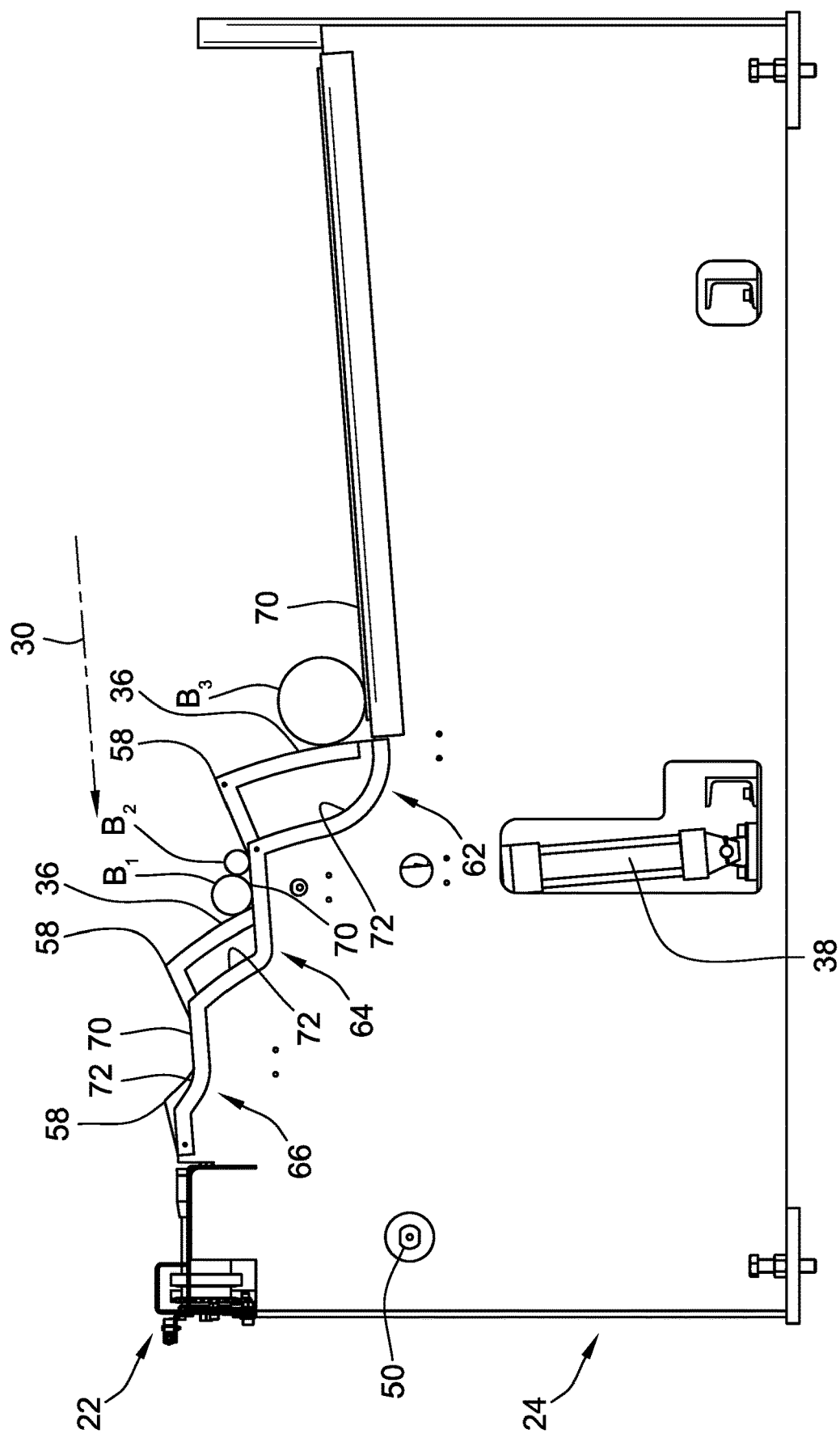
Figure 8:
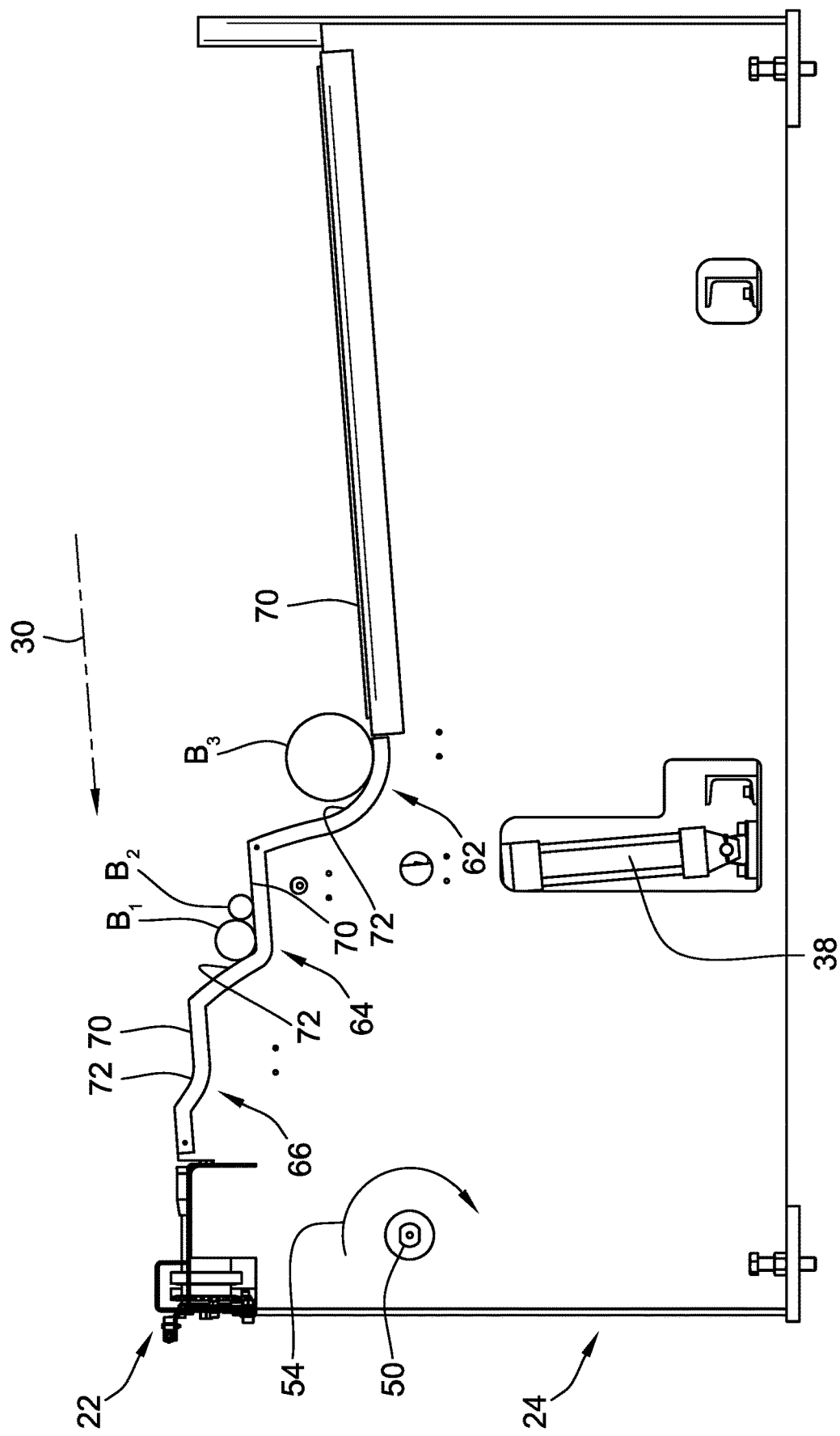

Turning now to FIG. 7, the same illustrates movable loading arm 36 in the raised position. In this position, billets $B_1$, $B_2$ have transitioned onto the next billet support portion 70, i.e. billet support portion 70 of loading segment 64. Movable loading arm 36 also prevents billets $B_1$, $B_2$, $B_3$ from rolling all the way forward in their respective billet support portions 70. FIG. 8 illustrates movable loading arm 36 returned to the lowered position. Billets $B_1$, $B_2$, have rolled forward towards ramped portion 72 of loading segment 64, while billet $B_3$ has rolled forward towards ramped portion 72 of loading segment 62.

Figure 9:
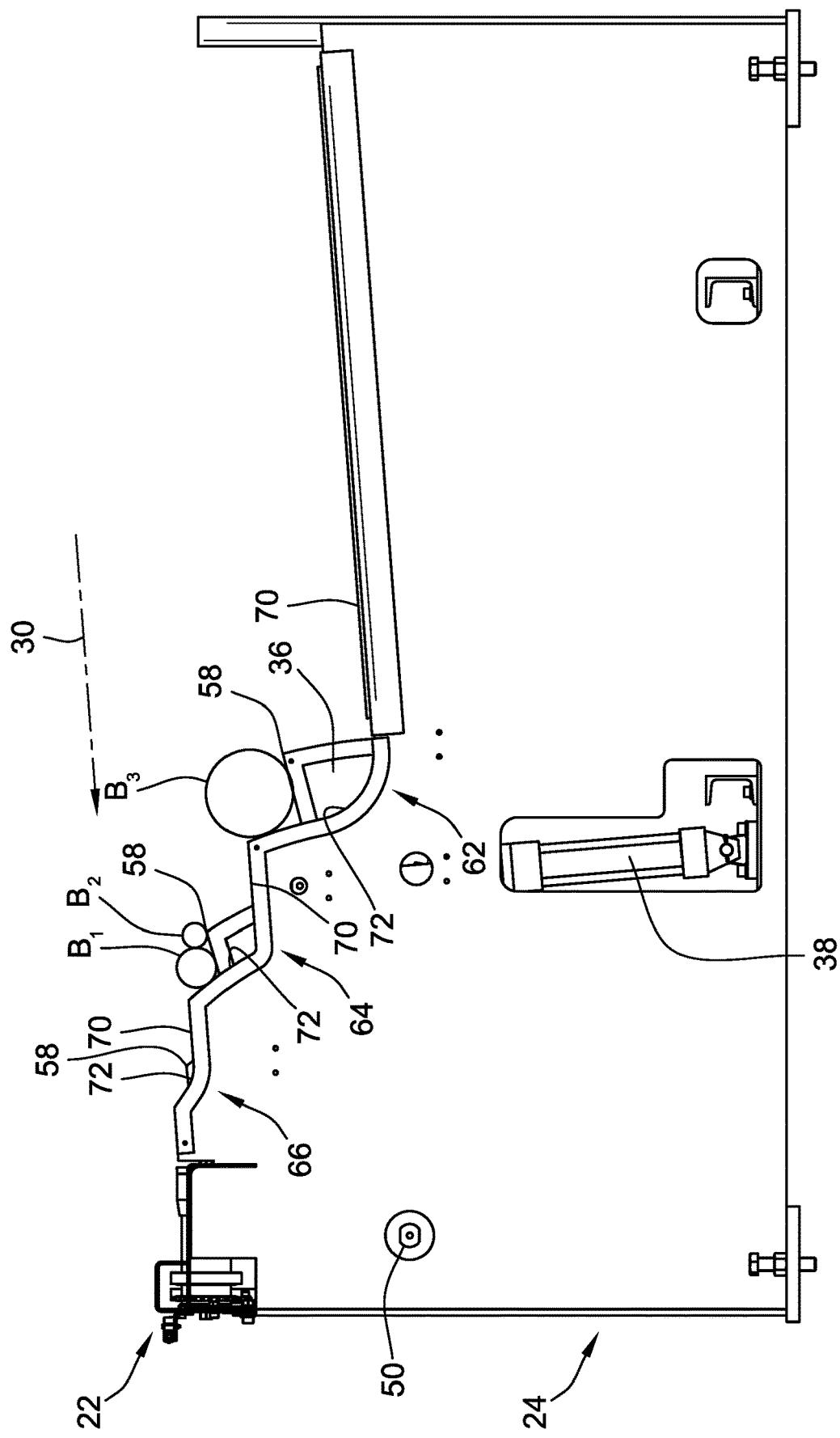
Figure 10:
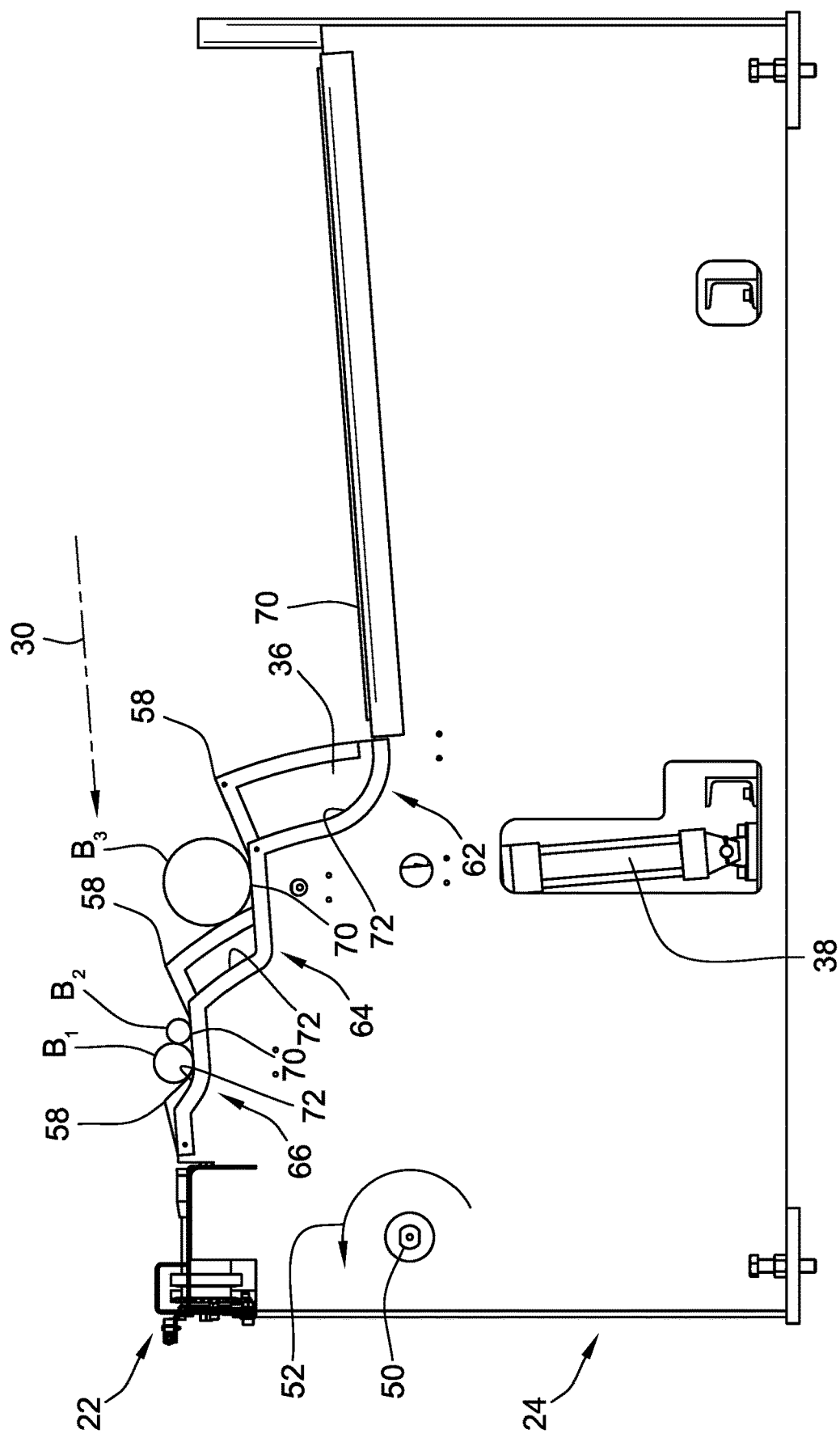

FIG. 9 illustrates movable loading arm 36 transitioning again from the lowered position to the raised position. Billets $B_1$, $B_2$ are lifted simultaneously from billet support portion 70 of loading segment 62, while billet $B_3$ is lifted from billet support portion 70 of loading segment 62. FIG. 10 illustrates movable loading arm in the raised position again. Billets $B_1$, $B_2$ are now on billet support portion 70 of loading segment 66, while billet $B_3$ is on billet support portion 70 of loading segment 64. Steps 58 prevent further forward motion of billets $B_1$, $B_2$, $B_3$ along loading direction 30.

Figure 11:
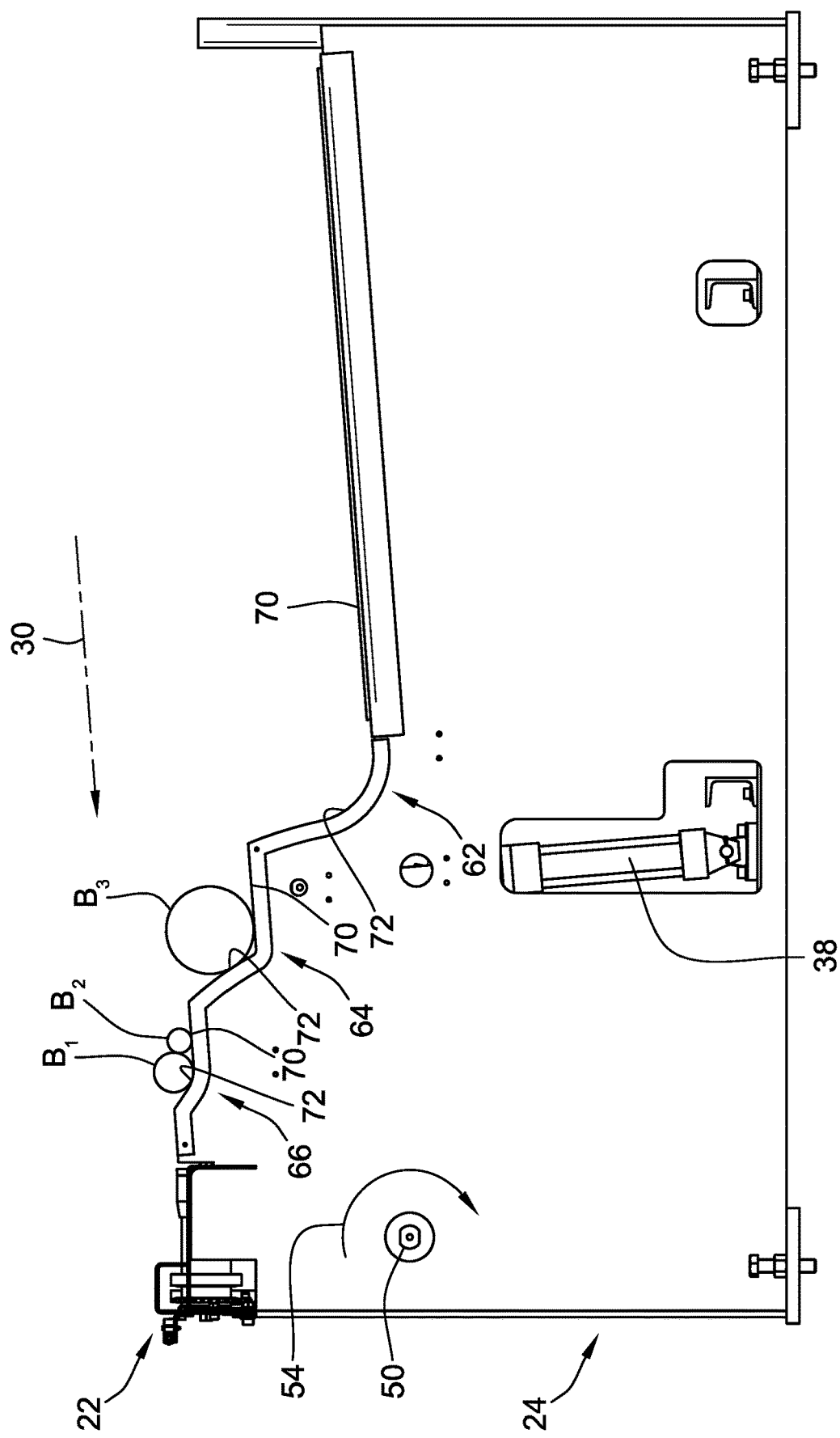

FIG. 11 illustrates movable loading arm 36 back in the lowered position, with billets $B_1$, $B_2$ at their final position on billet support portion 70 of loading segment 66, and billet $B_3$ it is final position on billet support portion 70 of loading segment 64. From inspection of FIGS. 9-11, it will be understood that in a single cycle of moving from the lowered position to the raised position, movable loading arm is operable to move simultaneously billets from their respective current billet support portions 70, to their respective next billet support portions.

Figure 12:
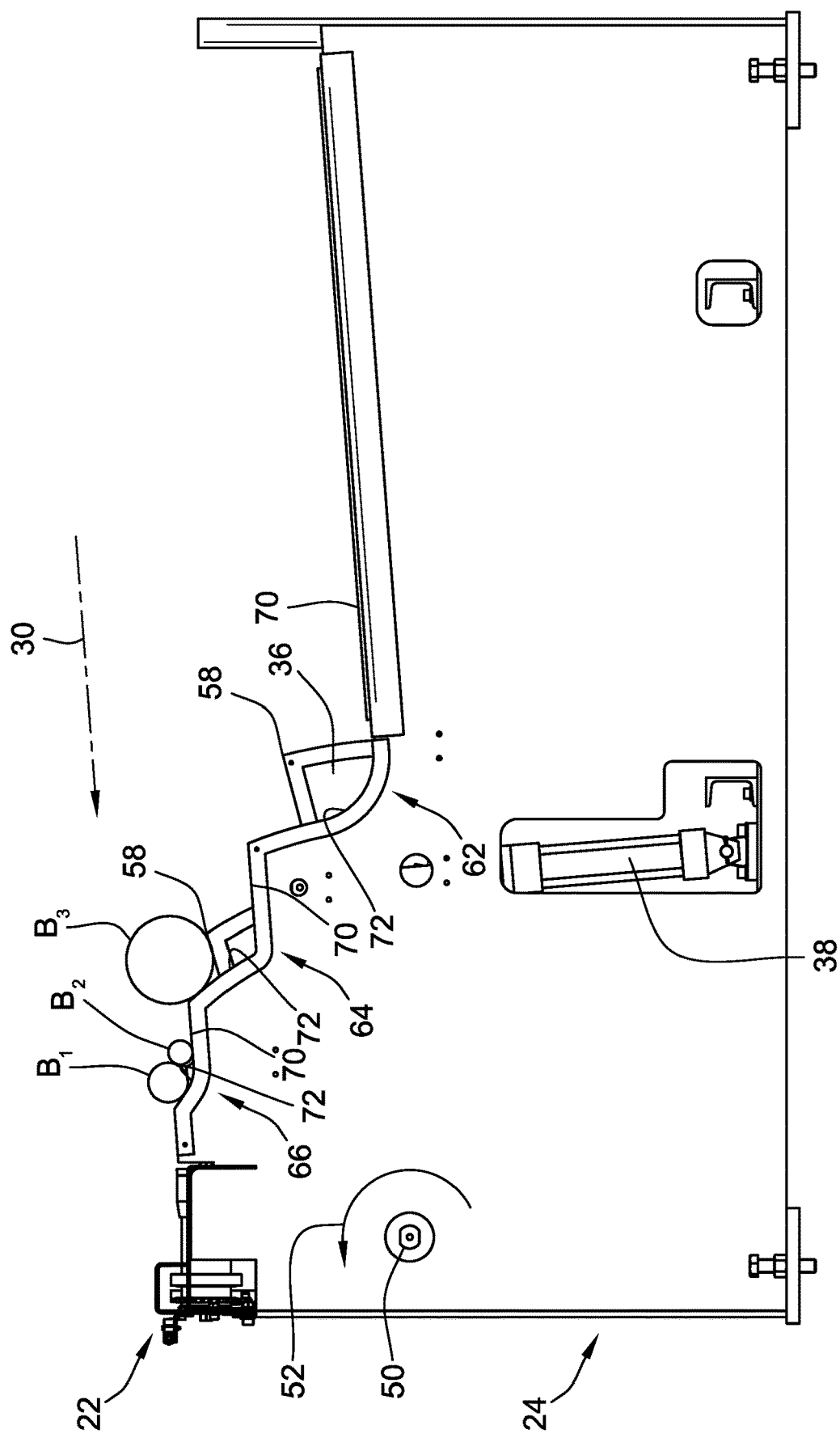
Figure 13:
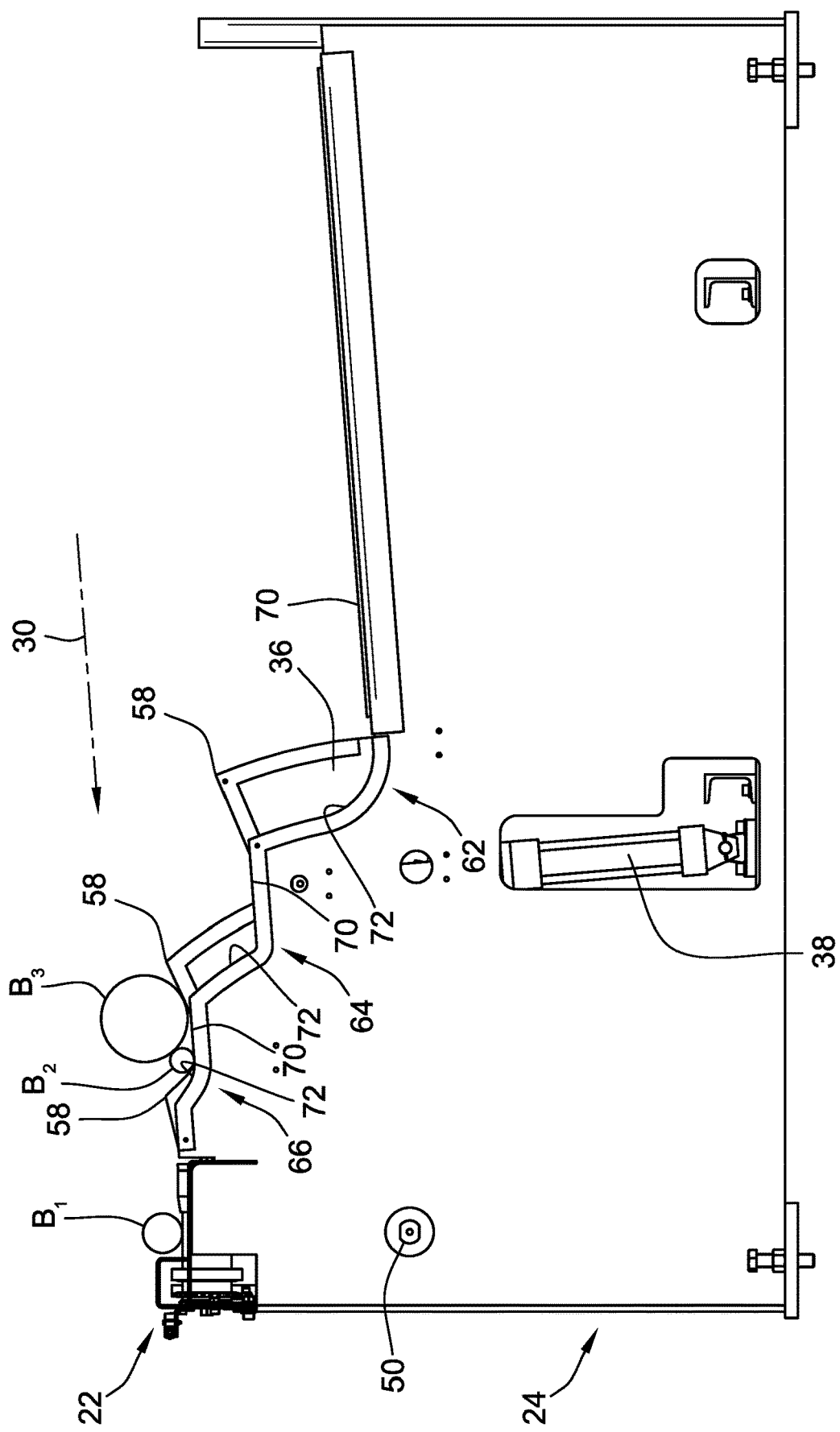
Figure 14:
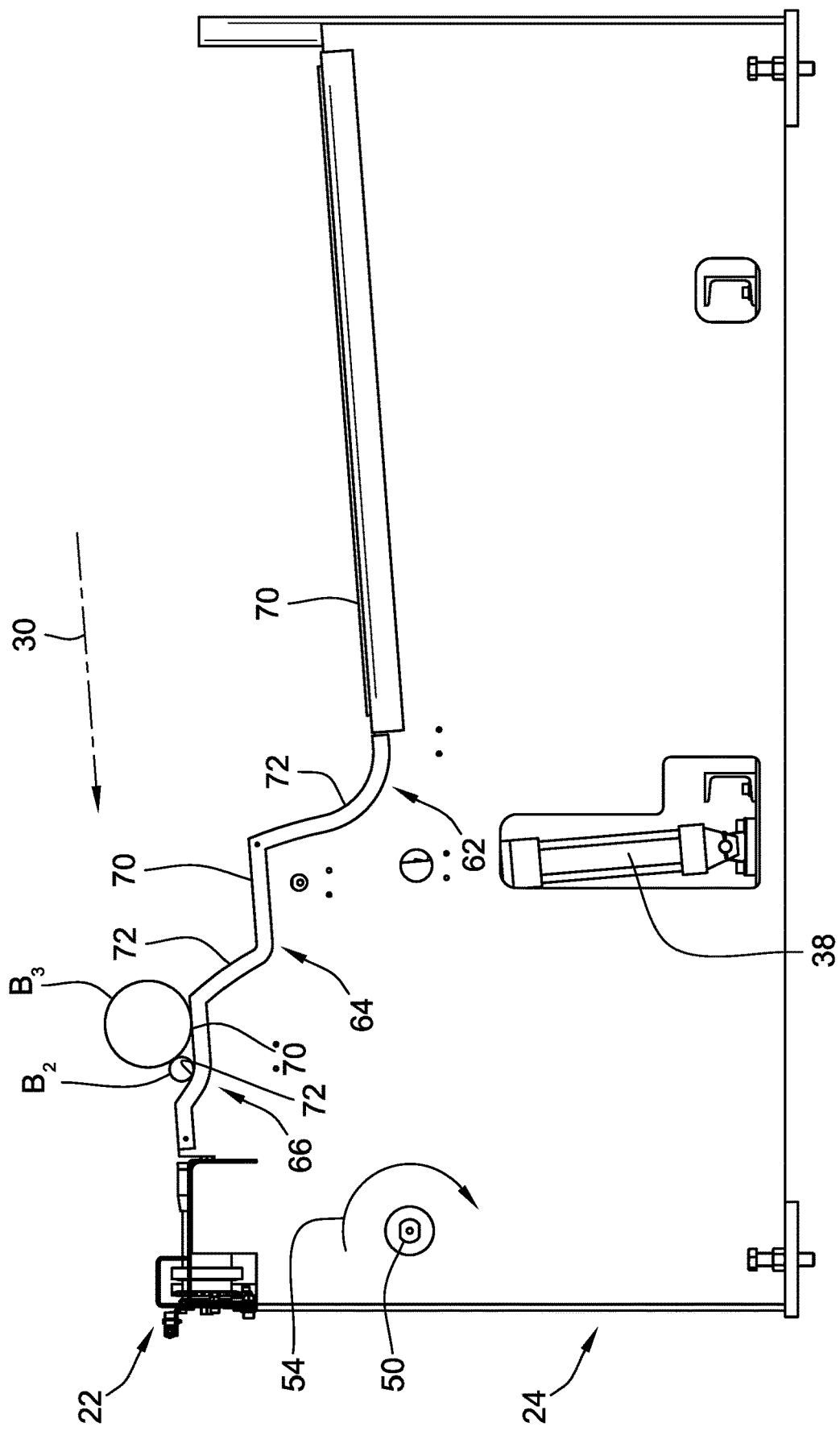

FIG. 12 illustrates movable loading arm 36 transitioning again from the lowered position to the raised position. Billet $B_3$ has been lifted off of billet support portion 70 of loading segment 64. FIG. 13 illustrates movable loading arm 36 in the raised position. Billet $B_1$ has been separated from its adjacent billet $B_2$ and rolled onto conveyor 22 via step 58 closest to conveyor 22. Due to the reduced amount of protrusion of the step 58 closest to conveyor 22 relative to ramped portion 72 of loading segment 66, only billet $B_1$ has been lifted and rolled onto conveyor 22. Billet $B_3$ remains on billet support portion 70 of loading segment 66. FIG. 14 illustrates movable loading arm 36 having moved back to the lowered position. Billets $B_2$, $B_3$ are now on billet support portion 70 of loading segment 66. Billet $B_1$ has been advanced along feed direction 28 (see FIG. 1) and is no longer on conveyor 22.

Figure 15:
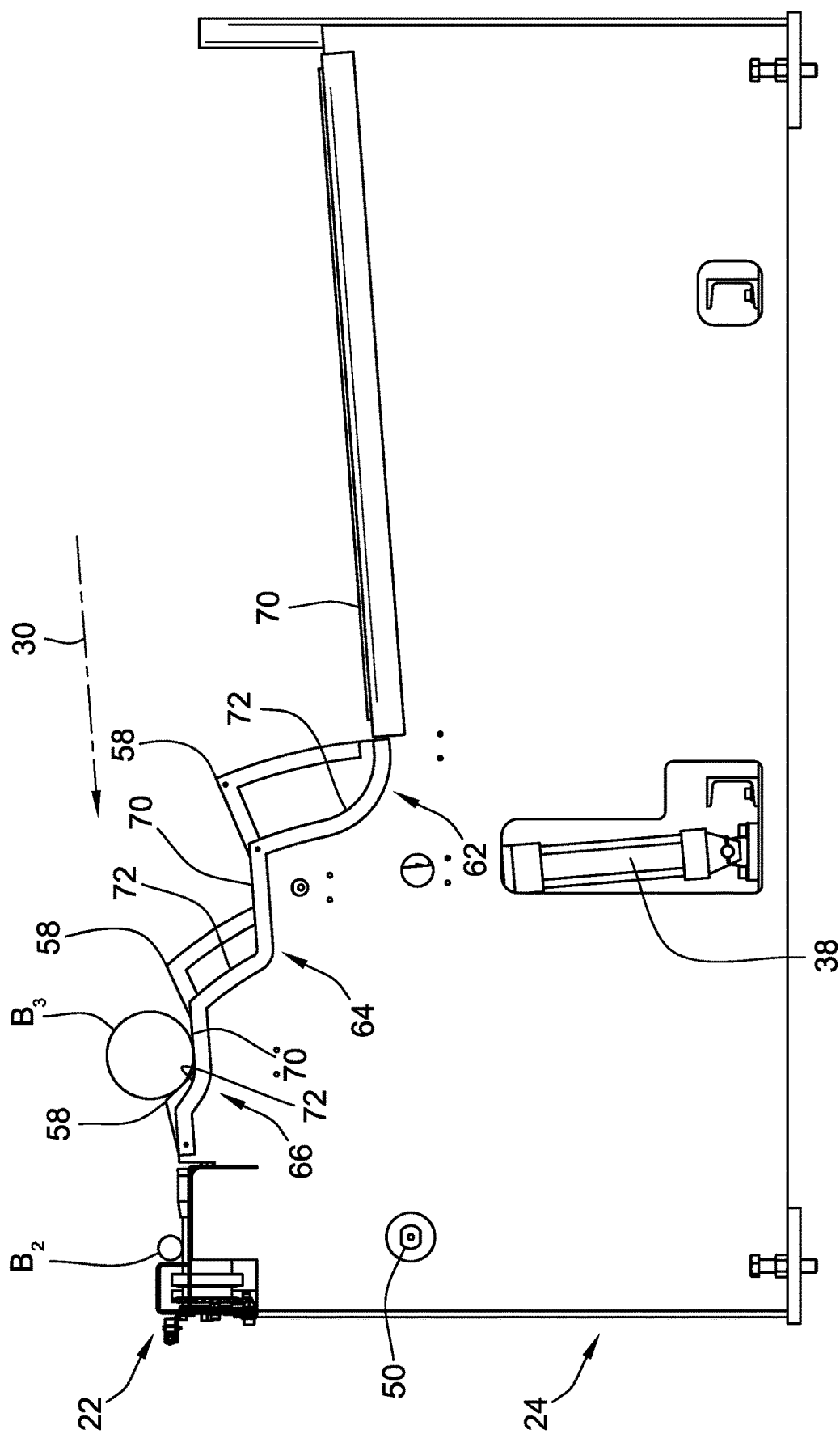
Figure 16:
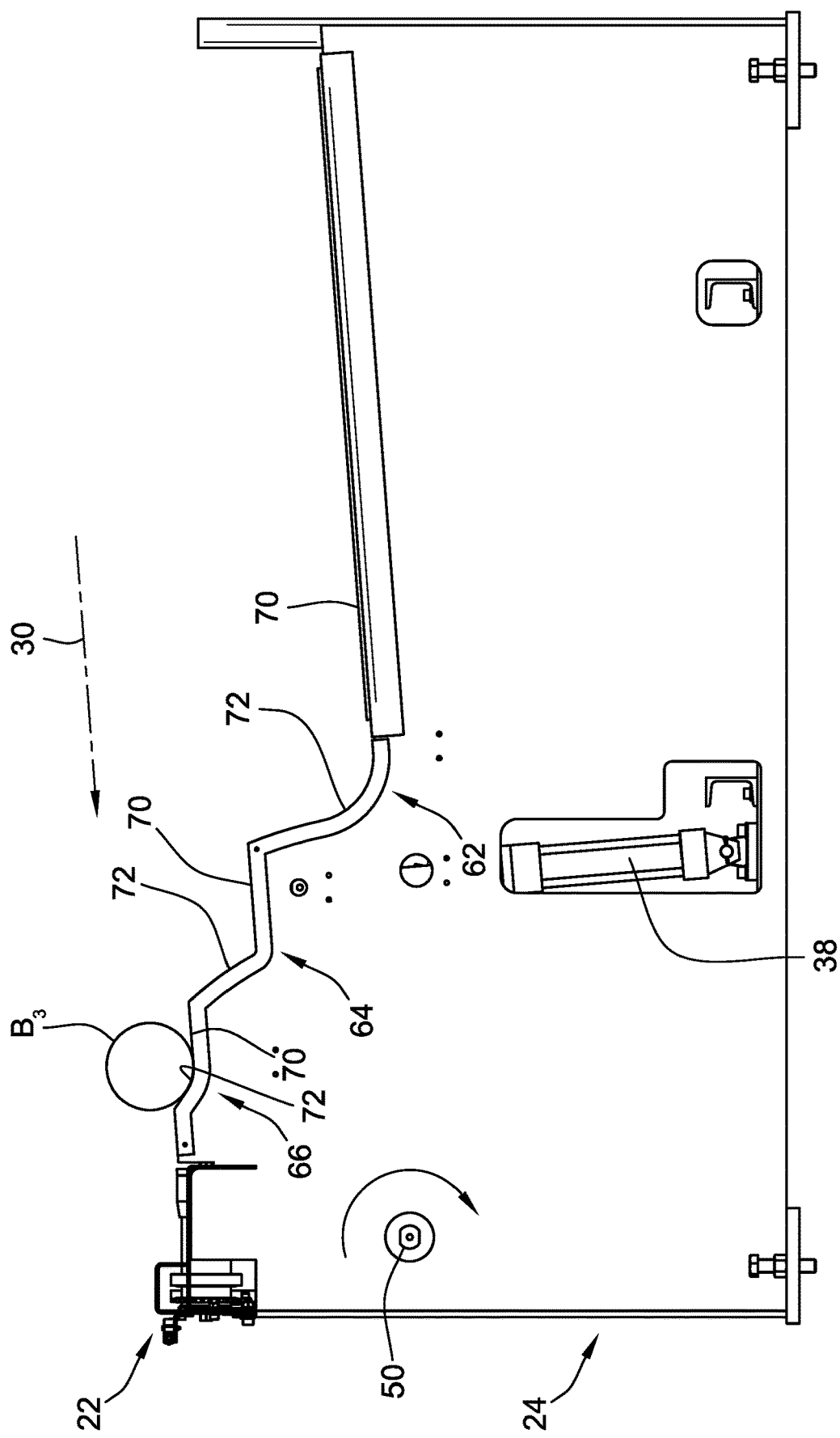

FIG. 15 illustrates movable loading arm 36 again in the raised position. Due to the reduced amount of protrusion of the step 58 closest to conveyor 22 relative to ramped portion 72 of loading segment 66, only billet $B_2$ has been lifted and rolled onto conveyor 22. Billet $B_3$ remains on billet support portion 70 of loading segment 66. FIG. 16 illustrates movable loading arm 36 again in the lowered position. Billet $B_2$ has been advanced along feed direction 28 (see FIG. 1) and is no longer on conveyor 22. Billet $B_3$ remains in billet support portion 70 of loading segment 66.

Figure 17:
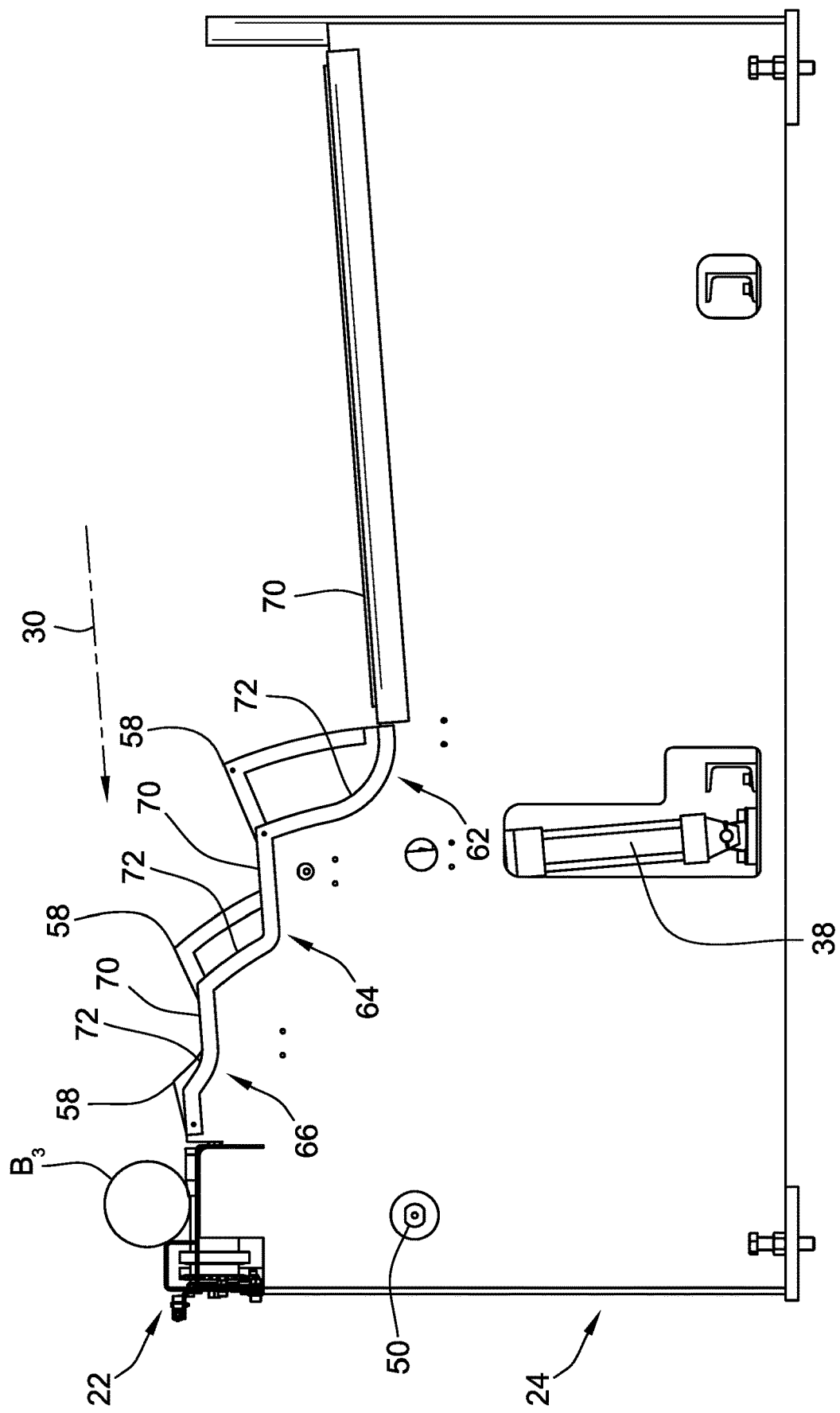

FIG. 17 illustrates movable loading arm 36 again in the raised position. Billet $B_3$ has been lifted by the step 58 closes to conveyor 22 such that it has rolled onto conveyor 22, and is read for transport along feed direction 28 (see FIG. 1). The above example illustrates how riser assembly 24 is operable in moving and separating the differently sized billets using a single mechanism.

Figure 18:
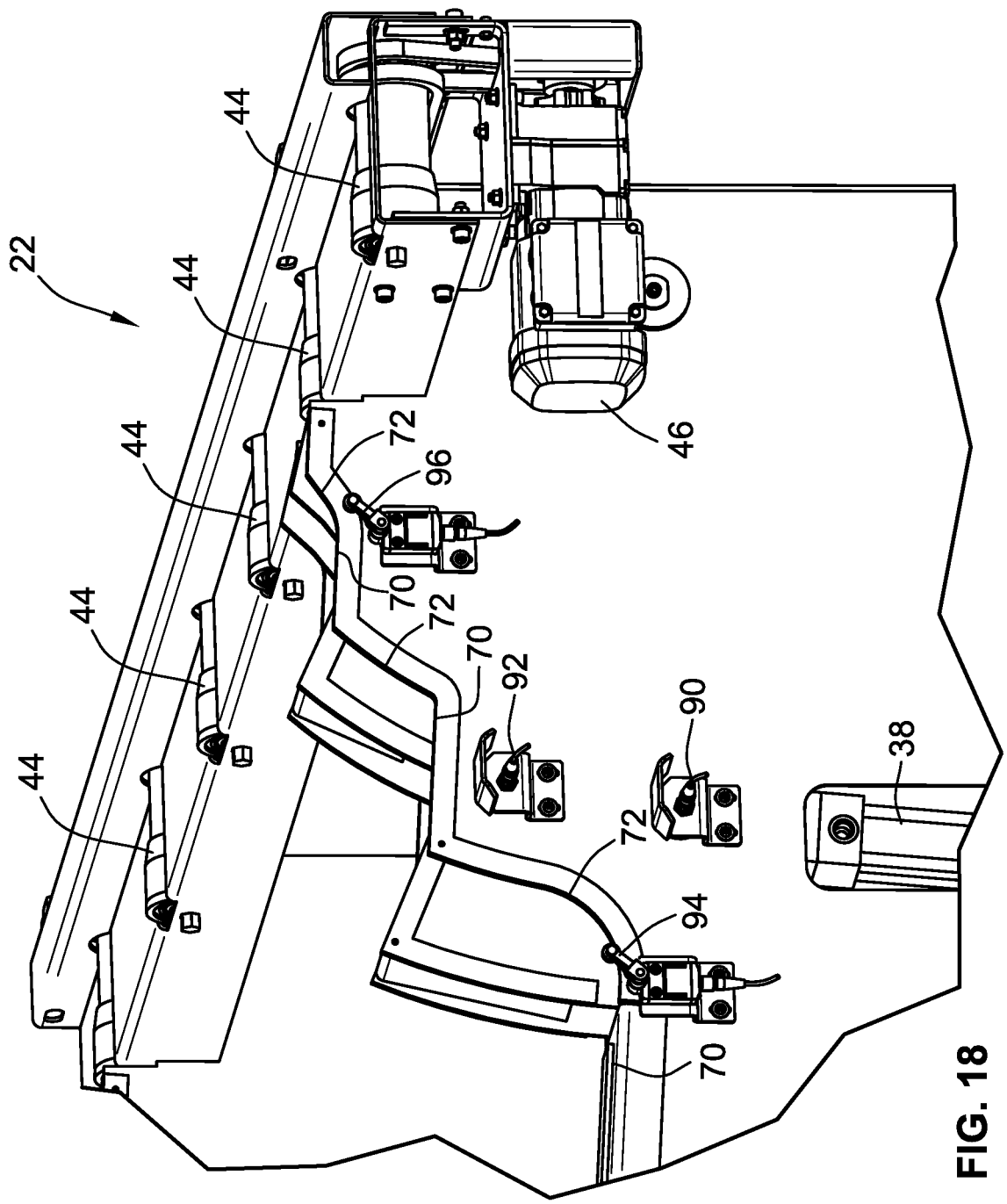
FIG. 18 is a partial perspective view of the automatic load table of FIG. 1.

Turning now to FIG. 18, the same illustrates examples of sensors used to ensure that the movement of movable loading arm 36 is efficient and done to achieve the movement of billets. Indeed, loading table 20 may employ a sensor 90 for detecting the presence of movable loading arm in the lowered position. Sensor 90 may take the form of any sensor useful for detecting an object, e.g. a camera, a light sensor, a hall effect sensor, touch sensor, etc. The same holds true for sensor 92, which is positioned to detect when movable loading arm 36 is in its raised position. Depending upon the sensor utilized, movable loading arm 36 may include corresponding structure such as magnets, decals, cam elements, etc. for detection by sensors 90, 92.

Similarly, one or more billet detection sensors may be employed for detecting when a billet is present in a particular loading segment. In the illustrated embodiment loading segment 62 includes a rocker arm switch sensor 94. Loading segment 66 also includes a rocker arm switch sensor. Sensors 94, 96 provide a signal indicative of the presence of a billet. While shown as rocker arm style switch sensor, sensors 94, 96 may take the form of any sensor capable of detecting the presence of a billet.

Sensors 90, 92, 94, 96 may communicate with a controller (not shown) which is capable of using the information received from these sensors to synchronize the motion of movable loading arm(s) 36 by sending a signal to its associated actuator(s) 38.

Figure 19:
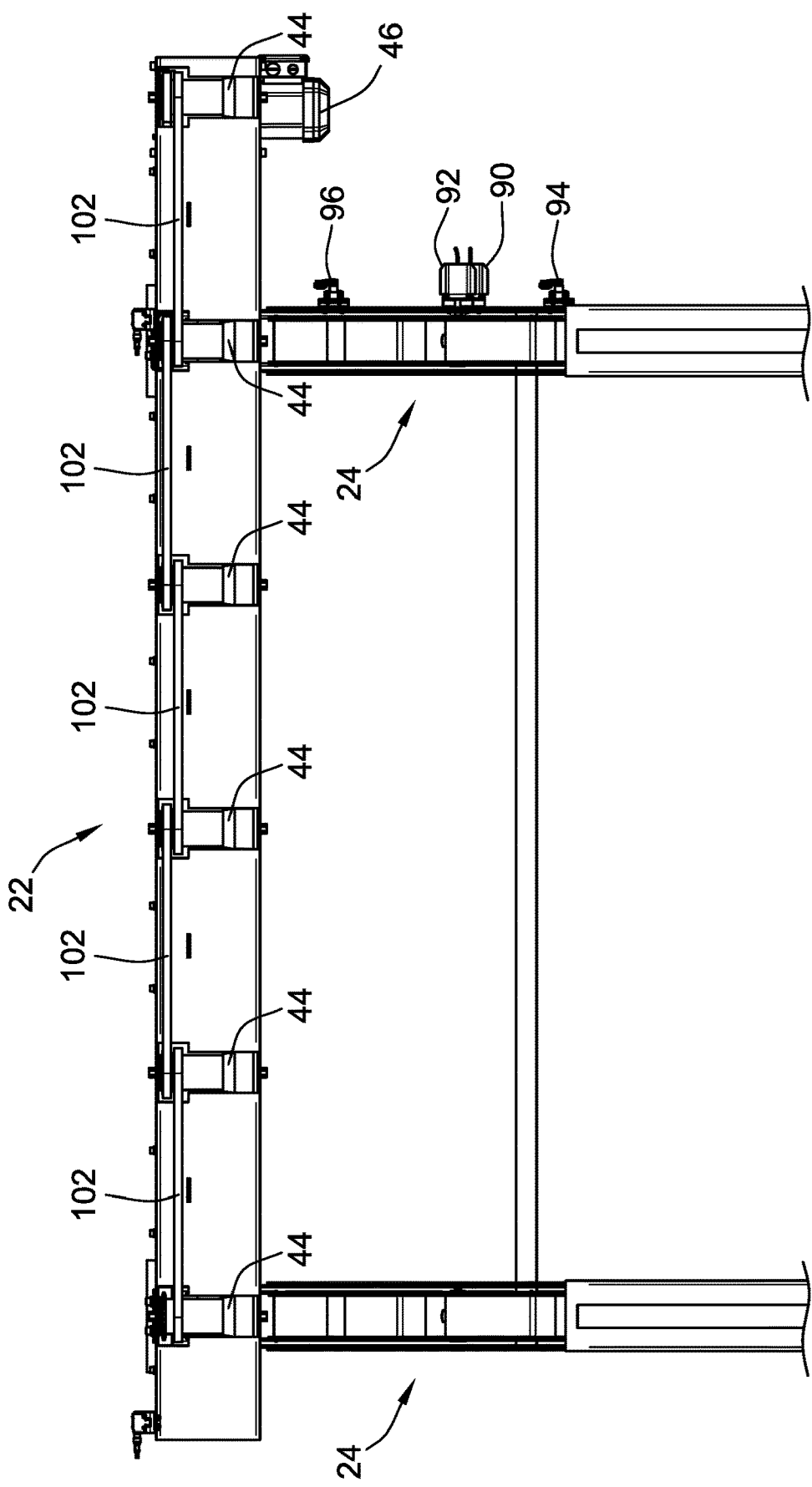
FIG. 19 is a top view of the automatic load table of FIG. 1.

FIG. 19 illustrates a top view of conveyor 22 with some of its shrouding removed. As may be seen in this view, rollers 44 may be synchronized with one another via interconnection via a plurality of belts 102. It is also contemplated that belts 102 could be replaced by a plurality of chains. In either case, motor 46 is operable to provide an input torque to rotate all of rollers 44 simultaneously.

Figure 20:
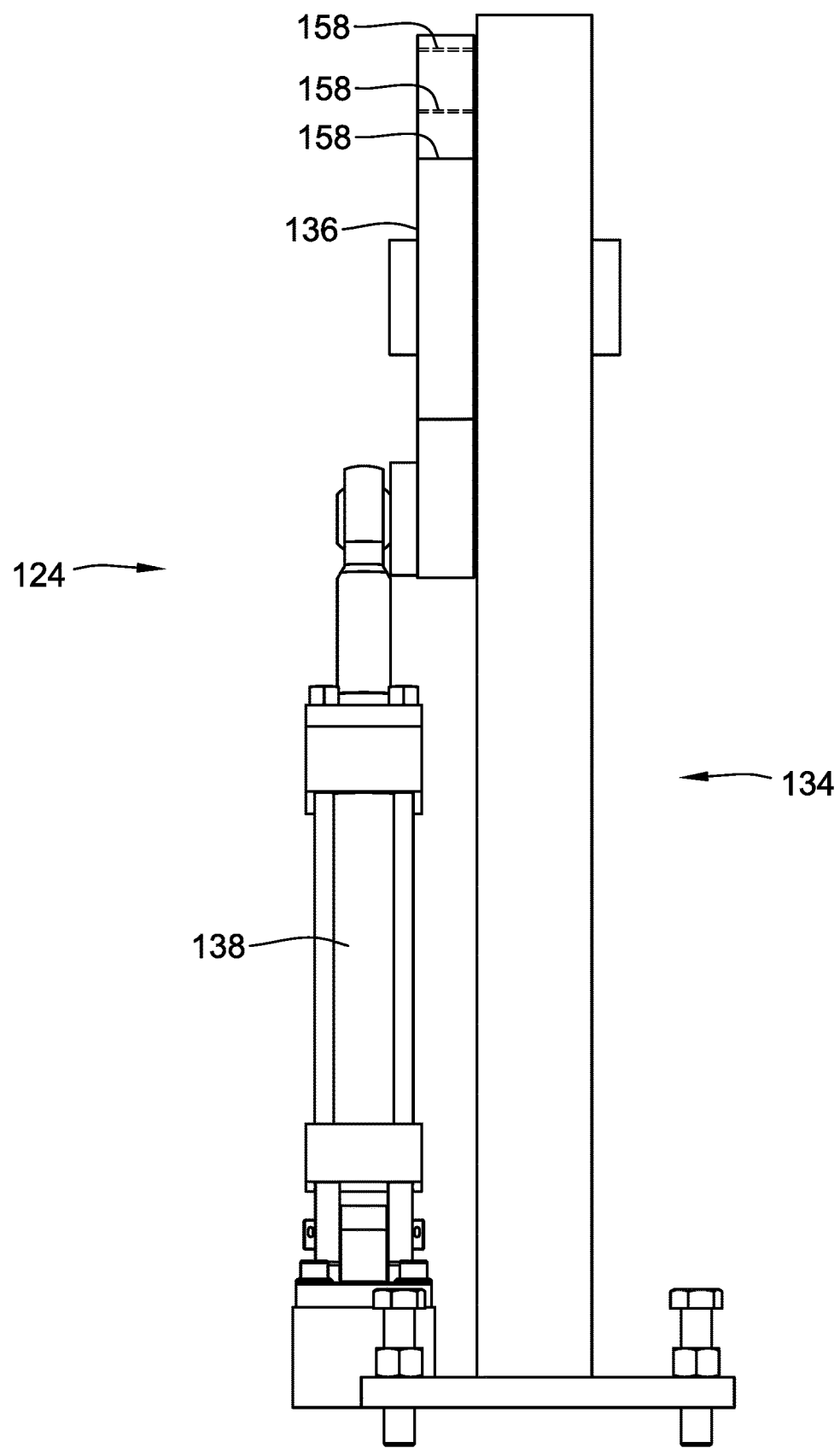
FIG. 20 is a front view of an alternative embodiment of a riser body and movable loading arm according to the teachings herein.

FIG. 20 illustrates an alternative configuration of a riser body assembly 124. In this embodiment, a movable loading arm 136 is formed as a single plate. Movable loading arm 136 has the same configuration of steps 158 as discussed above relative to steps 58. This movable loading arm 136 is actuated via an actuation means 138 which is the same as actuation means 38 described above. Movable loading arm 136 is positioned adjacent a riser body 134. Although not shown in FIG. 20, riser body 134 includes an identical configuration of loading segments as described above. It will thus be recognized that this embodiment of a riser assembly 124 differs only from riser assembly 24 described above in that it utilizes a plate-like movable loading arm 136, and a plate-like riser body 134. Movable loading arm 136 is mounted to an exterior of riser body 134, and is movable relative thereto in the same manner as described above. Additionally, movable loading arm 136 may be mounted to a mounting structure similar to the riser body 134 shown in FIG. 20. These components could then be contained within interior space 42 of riser assembly 34 shown and described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automatic load table for loading billets into a machine, the automatic load table comprising:
    a conveyor for advancing the billets in a feed direction;
    at least one riser assembly positioned adjacent the conveyor for moving the billets in a loading direction which is transverse to the feed direction onto the conveyor, wherein the at least one riser assembly comprises:
        a riser body;
        a loading arm movable relative to the riser body;
        wherein the riser body includes a plurality of billet support portions for supporting the billets from an underside of the billet and a plurality of ramped portions arranged such that one ramped portion is positioned between adjacent billet support portions, the billet support portions being at different elevations relative to one another; and
    wherein an extension height of each ramped portion successively decreases when progressing in the loading direction towards the conveyor;
    wherein the riser body is fixed;
    wherein each of the plurality of billet support portions defines upper-facing coplanar support surfaces, the support surfaces of each billet support portion defining a support plane for their respective billet support portion, the support planes of the plurality of billet support portions being parallel to one another; and
    wherein the loading arm defines a plurality of steps that, in a raised position, extends transversely above each respective support plane of the plurality of billet support portions.

2. The automatic load table of claim 1, wherein the riser body includes an interior space, wherein the loading arm is movable within the interior space.

3. The automatic load table of claim 1, wherein the at least one riser assembly further comprises an actuation means for moving the loading arm relative to the riser body.

4. The automatic load table of claim 3, wherein the actuation means is a linear actuator.

5. The automatic load table of claim 1, wherein the loading arm is attached at a pivot point of the riser body and is adjacent an exterior of the riser body.

6. The automatic load table of claim 5, wherein the loading arm includes a plurality of steps, the plurality of steps arranged to simultaneously advance each of the billets from a respective current billet support portion to a respective next billet support portion.

7. An automatic load table for loading billets into a machine, the automatic load table comprising:
    a conveyor for advancing the billets in a feed direction;
    at least one riser assembly positioned adjacent the conveyor for moving the billets in a loading direction which is transverse to the feed direction onto the conveyor, wherein the at least one riser assembly comprises:
        a riser body defining a first plurality of steps, wherein a height of each one of the plurality of steps successively decreases when progressing in the loading direction towards the conveyor;
        a loading arm movable relative to the riser body, the loading arm defining a second plurality of steps;
        wherein the loading arm is movable relative to the riser body such that the loading arm advances the billets in the feed direction up the first plurality of steps;
    wherein the riser body is fixed;
    wherein each of the first plurality of steps defines upper-facing coplanar support surfaces, the support surfaces of each step defining a support plane for their respective step, the support planes of the first plurality of steps being parallel to one another; and
    wherein, in a raised position, the second plurality of steps extend transversely above each respective support plane of the first plurality of steps.

8. The automatic load table of claim 7, wherein the first plurality of steps includes a plurality of billet support portions for supporting the billets from an underside of the billet, each billet support portion defining one of the support surfaces, and a plurality of ramped portions arranged such that one ramped portion is positioned between adjacent billet support portions.

9. The automatic load table of claim 8, wherein the billet support portions are at different elevations relative to one another.

10. The automatic load table of claim 8, wherein an extension height of each ramped portion successively decreases when progressing in the loading direction towards the conveyor.

11. The automatic load table of claim 8, further comprising at least one billet sensor, the at least one billet sensor arranged to detect the presence of a billet on a respective one of the billet support portions.

12. The automatic load table of claim 11, further comprising a first loading arm sensor and a second loading arm sensor, the first loading arm sensor configured to detect the loading arm at a lowered position of the loading arm, the second loading arm sensor configured to detect the loading arm at a raised position of the loading arm.

13. The automatic load table of claim 7, wherein the at least one riser assembly further comprises an actuation means for moving the loading arm relative to the riser body.

14. A method for feeding a billets into a machine, the method comprising:
    moving the billets along a loading direction through a plurality of loading segments;

separating a single billet from a remainder of the billets at at least one of the loading segments by lifting the single billet away from the remainder of the billets positioned at the loading segment, wherein each loading segment includes a billet support portion and a ramped portion, wherein a height of each ramped portion successively decreases along the loading direction;

wherein the step of moving is performed using a loading arm, the loading arm movable relative to a fixed riser body, the riser body defining the plurality of loading segments;

wherein each billet support portion defines an upper-facing coplanar support surface, the support surface of each billet support portion defining a support plane for its respective billet support portion, each support plane of each billet support portion being parallel to each other support plane of each billet support portion; and wherein the loading arm defines a plurality of steps that, in a raised position, each extends transversely above each respective support plane of each respective billet support portion.

15. The method of claim 14, wherein the step of moving the billets through the plurality of loading segments includes moving the billets from a current billet support portion to a next billet support portion at a different elevation than the current billet support portion.

16. The method of claim 15, wherein the step of moving the billets through the plurality of loading segments includes contacting the ramped portion between the current billet support portion and the next billet support portion with one of the billets.

17. The method of claim 14, wherein the step of separating the single billet is done by lifting the single billet using a portion of the movable loading arm such that the remainder of the billets remain at the loading segment.

18. The method of claim 14, further comprising situating the single billet on a conveyor and feeding the single billet along a feeding direction into the machine, the feeding direction transverse to the loading direction.

* * * * *